May 12, 1959

L. PRESSER 2,885,708

AUTOMATIC WINDOW CLEANER

Filed March 13, 1956

INVENTOR
LEISER PRESSER.
BY
ATTORNEY

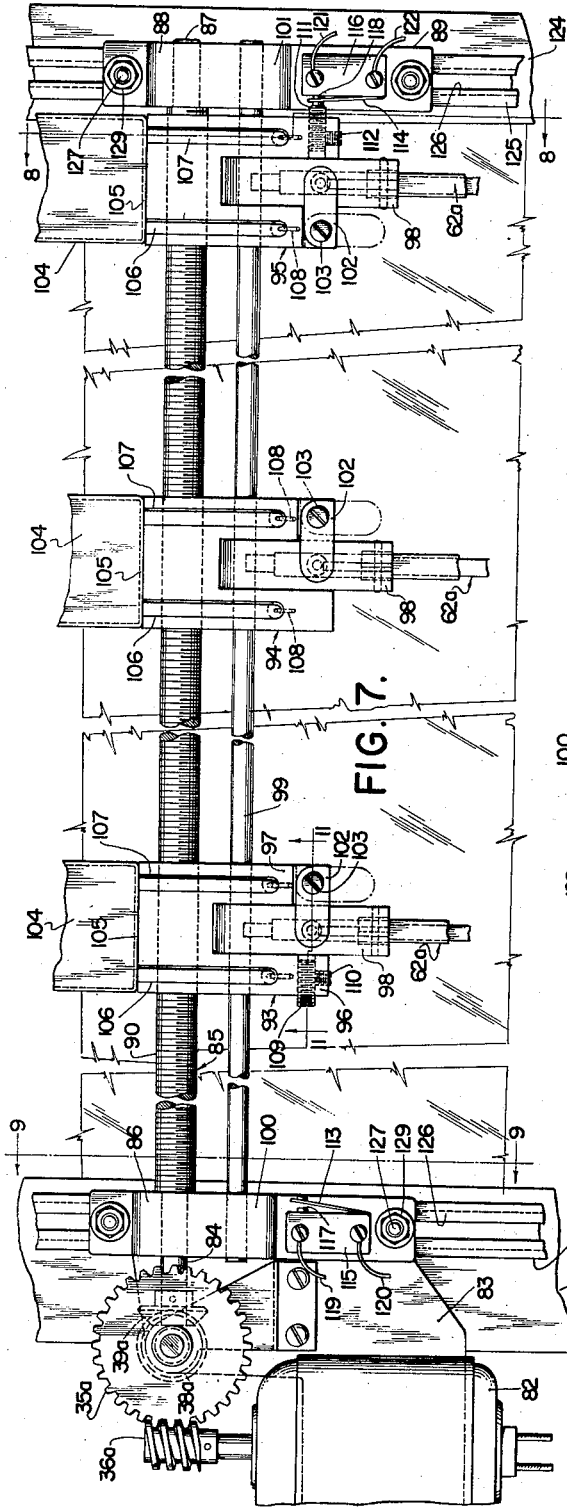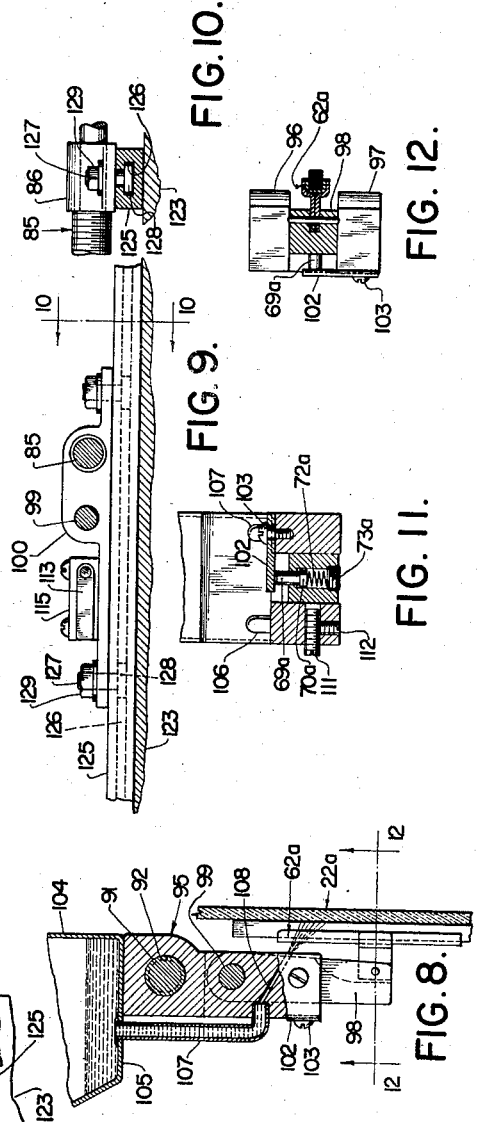

May 12, 1959
L. PRESSER
2,885,708
AUTOMATIC WINDOW CLEANER
Filed March 13, 1956
3 Sheets-Sheet 3
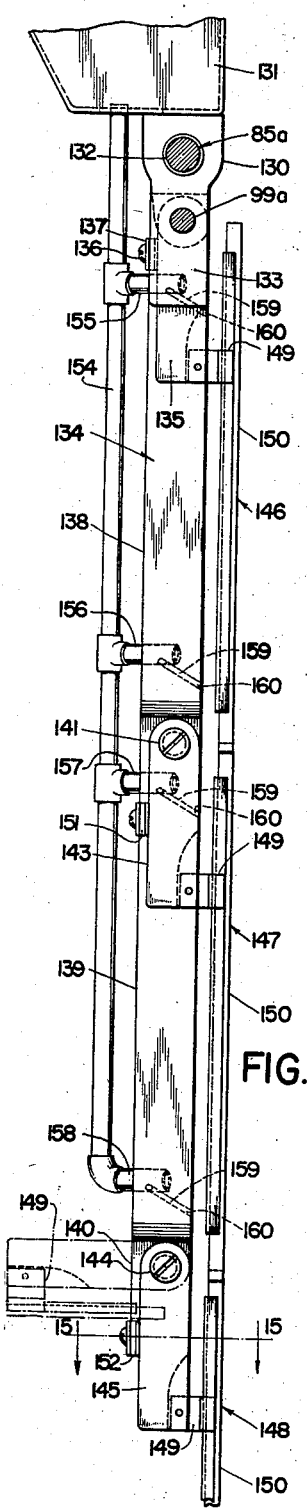
FIG. 13.
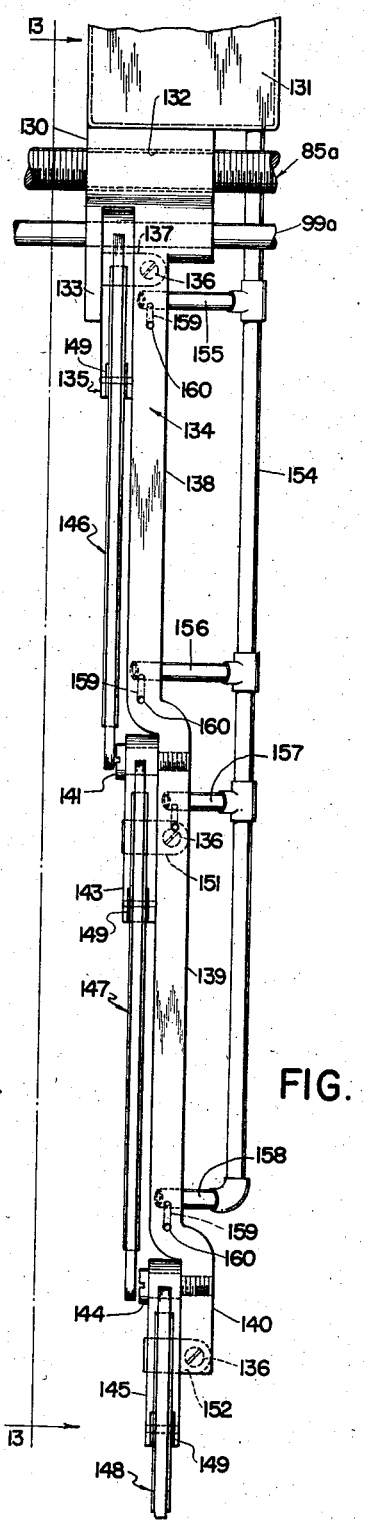
FIG. 14.
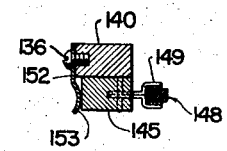
FIG. 15.
INVENTOR
LEISER PRESSER.
BY
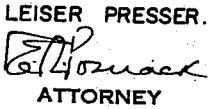
ATTORNEY

United States Patent Office 2,885,708
Patented May 12, 1959

2,885,708

AUTOMATIC WINDOW CLEANER

Leiser Presser, New York, N.Y.

Application March 13, 1956, Serial No. 571,169

2 Claims. (Cl. 15—250.4)

This invention relates to automatic window cleaners, and is particularly directed to devices of this category provided with water-supply and window-wiper elements.

It is primarily my objective to provide a device which is connected to a source of motive power, and which will automatically clean a window with which it is operatively associated, thereby eliminating the need to employ the conventional manual means for such purpose. And in this aspect of my invention it is my object to provide the said device with means which can readily be mounted on a window frame, and which will be effective in cleaning selected sections or the entire area of a selected window, in a simple and rapid manner, thereby not only eliminating the cost of employing window cleaners, but also rendering available the device for performing the desired operations at any and all times.

Other specific objectives are the provision of guiding means whereby the cleaning element is movable along a predetermined path, reversible means for effectuating a reciprocating action across the entire window or selected portions thereof, novel holding means for the wiper element for maintaining a yieldable pressure against the window being cleaned, retractable supports for the wiper element whereby it may be removed from its operative position for replacement purposes or for permitting access to the window and the opening thereof, adjustable means for varying the position of the device on a window, and water-ejecting means for coaction with the wiper element.

Other objects, features and advantages will appear from the drawings and the description hereinafter given.

Referring to the drawings,

Figure 7 is a fragmentary front view of a modified form of my invention showing three wiper elements and associated parts in operative position.

Figure 8 is a fragmentary section of Fig. 7 taken substantially along line 8—8.

Figure 9 is a fragmentary section of Fig. 7 taken substantially along line 9—9.

Figure 10 is a section of Fig. 9 taken along line 10—10.

Figure 11 is a section of Fig. 7 taken along line 11—11.

Figure 12 is a section of Fig. 8 taken along line 12—12.

Figure 13 is a vertical sectional elevation of another modification of my invention, the section being taken along line 13—13 of Fig. 14, one of the wiper-holder members being shown by dot-dash lines in its retracted position.

Figure 14 is a rear elevation of Fig. 13 taken along line 15—15.

Figure 15 is a section of Fig. 13 taken along line 15—15.

Figures 1, 2, 3, 4, 5, 6:
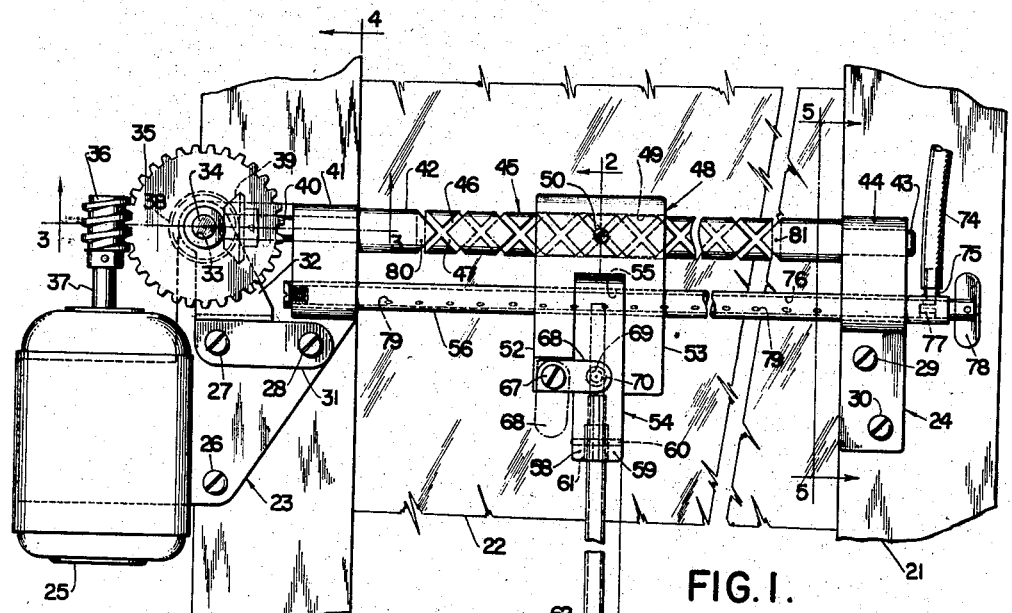
Figure 1 is a front view of one form of my invention shown mounted on the frame of a window with the wiper element in operative engagement with the window, the dot-dash lines showing the latch member (coactively associated with the retractable wiper holder) in its retracted position, fragmentary portions of said window and frame, and the hose line leading to the window cleaner, being shown.
Figure 2 is a fragmentary section of Fig. 1 taken along line 2—2, the dot-dash lines showing the wiper and holder therefor in retracted position, a spray of water being shown directed against the window.
Figure 3 is a fragmentary section of Fig. 1 taken substantially along line 3—3.
Figure 4 is a section of Fig. 1 taken substantially along line 4—4.
Figure 5 is a section of Fig. 1 taken substantially along line 5—5, a spray of water being shown directed against the window.
Figure 6 is a fragmentary perspective of the wiper element and pivotal supporting bracket.

In the various forms of my invention illustrated in the drawings, one or more wiper-carrier means are mounted on a rotatably mounted carrier rod, preferably provided with theaded means interengaged with said carrier means, whereby upon an operative rotation of the rod the carrier means will be moved along said rod to effect an operative wiping action against the window. There is also a guide member adjacent and in parallel relation to said carrier rod, a component of said carrier means being slidably mounted over said guide member, whereby the wiper element is maintained in operative position against the window, and is movable along a path determined by the position of said guide member. The various embodiments of my invention also include retractable holding means for the wiper element, said latter means being rotatably mounted over said guide member.

My invention includes the above-mentioned elements, among others, in various combinations to be hereinafter described. In the form of my invention illustrated in Figs. 1 to 6, the two lateral frames 20 and 21 of the window 22 support the respective base components 23 and 24 of the apparatus. Base 23, carrying the motor 25, is secured to frame 21 by the fasteners 26, 27 and 28; and base 24 is secured to frame 21 by the fasteners 29 and 30. Disposed upon base 23 is the bearing mounting 31, supported in place by the said fasteners 27 and 28, said mounting having an arm 32 containing an apertured portion 33 serving as a bearing for the shaft 34. Affixed to said latter shaft is the gear 35 in engagement with the worm 36 of the motor shaft 37. Said shaft 34 also has affixed thereto the bevel gear 38 in engagement with the coacting bevel gear 39 affixed to terminal shaft 40, the latter being supported by the bearing portion 41 of said base 23. In the embodiment illustrated, said shaft 40 is an integral part of the carrier rod 42 extending transversely across the window 22, the opposite portion of said rod containing terminal shaft 43 rotatably supported by the bearing portion 44 constituting an integral part of the said base 24.

The said carrier rod 42 contains a threaded portion 45 comprising a conventional double helical thread, one grooved portion 46 of said thread being in crossing relation to the other grooved portion 47, the arrangement being such that a carrier member (to be hereinafter described) in operative engagement with said thread will operatively move, upon a rotation of rod 42, first in one direction while engaging one of said threaded portions, and then, after the movable member has traversed the entire length of threaded portion 45, in the opposite direction while engaging the other of said threaded portions. In the particular embodiment illustrated, there is mounted over said threaded portion 45 of carrier rod 42 the wiper-carrier member 48 having a cylindrical bore 49 through which slidably extends said threaded portion 45. Said carrier member has extending therein the stud 50 the inner tip 51 of which extends inwardly of said bore 49 and is in engagement with one of the threads of said threaded portion 45, in known manner. The arrangement is such that upon an operative rotation of carrier rod 42, the said tip 51 will ride in one of said grooved threaded portions until it enters one of the end grooves 80 or 81 which communicates with the other of the grooved threaded portions, whereupon the tip 51 will enter said other threaded portion to cause a reverse movement of the carrier member 48 along the extent of rod 42. A more detailed description of the operation of said double helical portion is not deemed necessary for the purpose of this specification, since its construction is well known to those skilled in the art, and further because a detailed description thereof is not required for an understanding of this invention.

Carrier member 48 has two depending legs 52 and 53 spaced apart to accommodate the wiper arm 54. The latter contains along the upper portion thereof the bored portion 55 through which extends the tubular guide member 56, the proportions of the latter being such that the said arm 54 is slidably and swingably mounted thereover.

The said arm 54 contains a central recessed portion 57, whereby two wings 58 and 59 (Fig. 1) are formed. Extending through said wings is the pin 60; and pivotally mounted upon such pin is the bracket 61 supporting the wiper element 62. In the form illustrated said element comprises the channel 63 and the resilient wiper 64 protruding therefrom, the latter being adapted for wiping engagement with the window in known manner. As will be seen from Fig. 2, the pivotal bracket 61 is spaced a bit rearwardly from the medial wall 65 of arm 54, thereby providing a clearance space 66 to permit some play of the wiper element 62 with respect to the window 22 being cleaned thereby.

Pivotally mounted on screw 67 secured to leg 52 of carrier 48 is the latch member 68, the latter extending in front of said arm 54 when it is in operative position, as shown by the full-line representation of Fig. 1. Maintaining said latch 68 in its said operative position is the tip of the pin 69, the head 70 of which is slidably mounted within the cylindrical aperture 71 within arm 54, the spring 72 within said aperture bearing against said head 70 to cause said pin 69 to frictionally bear against latch 68 and hold it in its operative position. The said spring 72 is maintained in tensioned condition by the screw 73 in threaded engagement with the rear apertured portion of said arm 54, as illustrated in Fig. 2 (see also Fig. 11). It is evident that tension in the spring 72 can be adjusted by a manual turning of said screw 73.

A water hose 74 (from a supply not shown) extends over and in communication with the nipple 75 extending outwardly from the tube 56, said nipple being in communication with the internal passageway 76 of the tube through the valve member 77 operatively manipulated by the handle 78, in known manner. Extending along the length of said tube 56 and preferably in partial facing relation to the window 22 are a plurality of apertures 79. The arrangement is such that when the valve 78 is open and water is permitted to enter the tube 56, jets of the water will spray through said apertures against the window 22 above the wiper element 62, as illustrated in Figs. 2 and 5.

In the operation of this device, the operative rotation of motor 25 will cause the carrier rod 42 to rotate, whereupon the carrier member 53 moves longitudinally along said threaded portion 45 of the carrier rod 42. The movement continues between the said end grooves 80 and 81 of said threaded portion, there being automatic reversing movements of said carrier 48 in the manner aforesaid. Such movement causes a reciprocating wiping action of the wiper element 62 against the window 22, this action continuing as long as the motor 25 is in rotation. If the valve 77 is open, a plurality of jets of water from apertures 79 will be sprayed upon the window, as aforesaid, facilitating the cleaning action of the wiper element 62. Should it be desired to effect a dry wiping action, all that need be done is to shut off the valve 77 by a manipulation of handle 78.

In the event it is desired to substitute another wiper for the resilient wiper 64, which is frictionally held in place, all that need be done is to swing the latch 68 out of its operative position shown in Fig. 1 to its inoperative position, as illustrated by dot-dash lines in Fig. 1. This will permit the entire carrier arm 54 and the wiper element supported thereby to be retracted forwardly, as illustrated in Fig. 2, whereby the said substitution of wipers can be effected. The retraction of said arm 54 and the wiper element is also useful in that it removes the wiper element from its obstructive position in front of the window when it is desired to gain uninterrupted access thereto.

In the form of my invention illustrated in Figs. 7 to 12, a reversible motor 82 is operatively mounted on the base 83. The said motor is connected by gears 36a, 35a, 38a and 39a (substantially in the manner hereinabove described with reference to the first form of the invention) to the terminal portion 84 of carrier rod 85, said terminal portion 84 being rotatably supported by the bearing 86. At the opposite end of carrier rod 85 is the terminal shaft 87 rotatably supported by the bearing portion 88 mounted upon base 89.

The said carrier rod 85 contains a conventional carrier thread 90 thereon; and in operative engagement with said thread 90 are the respective threaded portions 91 of the bored walls 92 of wiper-carrier members 93, 94 and 95. The said carrier members are mounted in spaced relation, and are so positioned that upon the operative rotation of carrier rod 85, they will move in unison along portions of the longitudinal extent of said rod 85. As in the form first above described, each of said carrier members has spaced depending legs 96 and 97 between which is mounted a wiper arm 98, the latter having a central bore therethrough through which extends the guide rod 99 operatively supported by structures 100 and 101 mounted, respectively, on said bases 83 and 89. Each of said arms 98 is swingably mounted over said rod 99, and is maintained in its operative position by a latch member 102 pivotally supported by a fastener 103 on one of said depending legs of the corresponding carrier member. As illustrated in Fig. 11, showing the latch in its closed position, the pin 69a is maintained in frictional engagement with the latch 102 by the action of spring 72a against the head 70a of said pin, the adjusting screw 73a maintaining the desired tension in said spring to keep the latch 102 in its operative position. By operatively swinging the latch 102 into its retracted position (as shown by the dot-dash position of the latch on carrier 93, Fig. 7) the coacting wiper arm 98 can be retracted in the manner aforesaid. The wiper element 62a is pivotally supported upon arm 98 in the manner above described with respect to the first form illustrated.

This particular embodiment shows water reservoirs 104 mounted on each of said carrier members 93, 94 and 95. Extending downwardly from the base 105 of each of said reservoirs are two pipes 106 and 107, these extending into the legs 96 and 97 of the respective carriers. In the arrangement illustrated, inclined ducts 108 communicate with the terminals of each of said pipes 106 and 107, the rear outlet of each of said ducts facing the window 22a, as illustrated in Fig. 8.

It will further be noted that carrier 93 has an outwardly protruding stud 109 maintained in position by the locking screw 110; and carrier 95 has a similar but oppositely positioned outwardly extending stud 111 maintained in position by the screw 112. These studs are positioned for operative engagement with the respective contact arms 113 and 114 of the respective microswitches 115 and 116. As shown in Fig. 7, stud 111 is in engagement with arm 114, the latter having been brought into engagement with contact 118 of the microswitch 116. The said stud 109 is also adapted for engagement with arm 113, for bringing the arm into electrical engagement with the contact 117 on microswitch 115. Electrical conductors 119, 120 and 121, 122 are electrically connected to the said reversible motor 82 in known manner. The arrangement is such that when the circuit is operatively closed through microswitch 115, the motor 82 will operate in one direction; and when the circuit is operatively closed through microswitch 116, the motor 82 will operate in the opposite direction, all in well-known manner. No detailed description of the circuit connecting the respective microswitches and reversible motor 82 is herein given, since such construction is of conventional nature and is well known to those skilled in the art, and further because such a detailed description will not further aid in an understanding of the present invention.

From the above description it is apparent that when the motor 82 operates in one direction, the carrier rod 85 will operate in a corresponding direction, whereupon the three wiper-carrier members 93, 94 and 95 will move in unison in one direction. This continues until one of the end carriers, such as carrier 95, reaches an end position, such as is illustrated in Fig. 7. When the microswitch 116 is operatively actuated, the circuit is closed through microswitch 116, causing a reversing of motor 82, thereby also causing a reversed movement of carrier rod 85 and the three carriers operatively mounted upon it. Similarly, when the carrier 93 reaches the extreme left position, the microswitch 115 will be actuated, in the manner described, to close the circuit through microswitch 115 and thereby cause a change of direction of motor 82.

It is thus apparent that as long as the motor 82 continuously operates, there will be a continuous window-cleaning operation of the three carrier members, the actoin being of reciprocating nature, for the reasons hereinabove given; and inasmuch as there are a plurality of wiper members, it is evident that the cleaning action can be very rapid.

This embodiment is further provided with adjustable means to enable the entire unit to be moved vertically along a window, so as to enable different sections of the window to be cleaned. The lateral window frames 123 and 124 each contains a track 125, each having therein a longitudinal T-slot 126. The respective bases 83 and 89 on opposite sides of the window contain bolts 127 the heads 128 of which are slidably positioned within said T-slots. To adjustably move the unit to a new position, the nuts 129 are loosened, whereupon the entire unit can be slidably moved to a desired new position, whereafter the nuts 129 are tightened to secure the unit in such position.

In the form of my invention illustrated in Figs. 13 to 15, a carrier rod 85a and guide rod 99a are employed, these being substantially analagous to the correspondingly numbered components of Figs. 7 to 12. Mounted on the upper carrier member 130 is the reservoir 131, supplying water to a plurality of carrier members, in a manner to be hereinafter described. Carrier member 130 contains the threaded bored portion 132, whereby the operative rotation of carrier rod 85a will cause an operative movement of carrier 130 and its associated parts substantially in the manner above described.

The said carrier member 130 contains a short depending leg 133, and substantially parallel and in spaced relation thereto the elongated bar 134. Disposed between leg 133 and bar 134 is the upper wiper-element arm 135 swingably mounted upon guide rod 99a. Pivotally mounted on bar 134 at 136 is the latch 137, preventing a retraction of said arm 135, in the manner aforesaid.

The said bar 134 contains the upper portion 138, the intermediate portion 139 and the bottommost portion 140, these being progressively offset with respect to each other. Extending through and supported by the top of intermediate portion 139 is the stud 141 upon the shank of which the intermediate wiper arm 143 is rotatably supported. Extending through and supported by the said bottom-most portion 140 is the stud 144 upon the shank of which is rotatably mounted the wiper arm 145. Wiper elements 146, 147 and 148 are pivotally mounted upon their respective arms 135, 143 and 145 by the brackets 149, in the manner aforesaid. The rear edges 150 of all said wiper elements are in one plane, so that they may simultaneously engage an adjacent window during the operative movement of the carrier 133 in the longitudinal direction of said carrier rod 85a. The said latch 137, as well as the latches 151 and 152, are retractable, to permit the respective arms 135, 143 and 145 to be operatively retracted, together with the associated wiper elements 146, 147 and 148. It will be noted that the latter are in overlapping relation, so as to assure that all portions of the window are operatively engaged by the wipers with no spaces therebetween. Because of the above-described offset relationship of portions 138, 139 and 140 of the carrier bar 134, all three wiper elements can be operatively retracted without interference.

Fig. 15 shows the latch construction employed in this embodiment of my invention. The latch 152, of spring material, has an inwardly curved portion 153 in engagement with the corresponding wiper arm 145, thereby yieldably holding it in position against the window.

Extending down from the base of reservoir 131 is the main water feed pipe 154, having branches 155, 156, 157 and 158 leading into spaced portions of carrier bar 134. The said branches communicate with channels 159 which terminate in outlets 160 adjacent the wiper elements. In this manner a plurality of sprays can be directed against the window during the operative wiping action of this device.

With the last-described embodiment of my invention it is apparent that vertically aligned sections of a window can be simultaneously cleaned by a plurality of coacting wiper elements.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In an automatic window-cleaning device, a wiper element, a carrier member, a rotatable threaded carrier rod, means to rotate said rod, elongated guide means parallel to said rod, said carrier member having an arm supporting said wiper element and two open-ended apertured portions, water conduit means, an apertured portion on said conduit means disposed above said wiper element and facing generally rearwardly, said rod extending through one of said apertured portions and said guide means extending through the other of said apertured portions, said arm being rotatably and slidably mounted over said elongated guide means, said carrier member being in threaded engagement with said carrier rod and in slidable engagement with said guide means, whereby the operative rotation of said carrier rod will cause an operative movement of said carrier member and said arm and wiper element in the direction of the longitudinal extent of said rod.

2. In an automatic window-cleaning device, a wiper element, a carrier member supporting said element, a rotatable threaded carrier rod, means to rotate said rod, an elongated tube parallel to said rod, said carrier member having an arm supporting said wiper element and two open-ended apertured portions, said rod extending through one of said apertured portions and said tube extending through the other of said apertured portions, said arm being rotatably and slidably mounted over said tube, said carrier member being in threaded engagement with said carrier rod, whereby the operative rotation of said carrier rod will cause an operative movement of said carrier member and said arm in the direction of the longitudinal extent of said tube, said wiper element being pivotally attached to said arm, apertured means in said tube disposed generally rearwardly thereof, and water conduit means communicating with the interior of said tube.

References Cited in the file of this patent

UNITED STATES PATENTS

| | | |
|---|---|---|
| 1,476,174 | Parker et al. | Dec. 4, 1923 |
| 1,485,097 | Tuttle et al. | Feb. 26, 1924 |
| 1,612,487 | Bourgeois | Dec. 28, 1926 |
| 1,924,922 | Gehrig | Aug. 29, 1933 |

FOREIGN PATENTS

| | | |
|---|---|---|
| 218,579 | Great Britain | July 10, 1924 |